(12) United States Patent
Sun et al.

(10) Patent No.: US 12,166,374 B2
(45) Date of Patent: Dec. 10, 2024

(54) LOW POWER STANDBY CIRCUIT

(71) Applicant: SOCIETE DES PRODUITS NESTLE S.A., Vevey (CH)

(72) Inventors: Bill Jiangbo Sun, Guangdong (CN); Wing Wei Wang, Shenzhen (CN)

(73) Assignee: Societe des Produits Nestle S.A., Vevey (CH)

( * ) Notice: Subject to any disclaimer, the term of this patent is extended or adjusted under 35 U.S.C. 154(b) by 7 days.

(21) Appl. No.: 18/246,719

(22) PCT Filed: Sep. 22, 2021

(86) PCT No.: PCT/EP2021/075990
§ 371 (c)(1),
(2) Date: Mar. 27, 2023

(87) PCT Pub. No.: WO2022/069301
PCT Pub. Date: Apr. 7, 2022

(65) Prior Publication Data
US 2023/0378801 A1 Nov. 23, 2023

(30) Foreign Application Priority Data

Sep. 29, 2020 (WO) ................ PCT/CN2020/118965

(51) Int. Cl.
*H02J 1/10* (2006.01)
*A47J 31/52* (2006.01)
*H02J 9/00* (2006.01)

(52) U.S. Cl.
CPC .............. *H02J 9/005* (2013.01); *A47J 31/52* (2013.01)

(58) Field of Classification Search
CPC ....................................................... H02J 9/005
See application file for complete search history.

(56) References Cited

U.S. PATENT DOCUMENTS

| 5,175,441 A | * | 12/1992 | den Hollander | H04B 1/1607 348/730 |
| 7,991,588 B1 | * | 8/2011 | Krieger | G06F 11/3034 702/186 |

(Continued)

FOREIGN PATENT DOCUMENTS

| CN | 201374773 | 12/2009 |
| WO | 2012028016 | 3/2012 |
| WO | 2016156096 | 10/2016 |

*Primary Examiner* — Jared Fureman
*Assistant Examiner* — Esayas G Yeshaw
(74) *Attorney, Agent, or Firm* — K&L Gates LLP

(57) ABSTRACT

Standby circuit for an electric appliance, the standby circuit comprising: an AC power input for connection to an AC power source, for example to the mains; an AC power output for connection to a control circuit of an electric appliance; a control circuit power line connecting the AC power input to the AC power output, the control circuit power line comprising a control circuit power switch for closing and opening the control circuit power line; a logic device for controlling the control circuit power switch; an auxiliary AC to DC converter connected to the AC power input for supplying DC power to the logic device when the control circuit power line is open; a power-on AC to DC converter connected to the AC power output for supplying DC power to the logic device when the control circuit power line is closed; one or more passive and/or active input components for sensing an input of a user of said electric appliance and generating a corresponding signal; wherein the logic device is configured to receive the signal from the one or more passive and/or active input components, and to control the control circuit power switch based on this signal. Electric appliance comprising such a standby circuit and method for bringing such an appliance from its standby mode to its operative mode.

15 Claims, 2 Drawing Sheets

(56) References Cited

U.S. PATENT DOCUMENTS

2009/0224603 A1  9/2009  Perper et al.
2021/0036698 A1* 2/2021  Nakano .............. H03K 17/0824

* cited by examiner

LOW POWER STANDBY CIRCUIT

CROSS REFERENCE TO RELATED APPLICATIONS

The present application is a National Stage of International Application No. PCT/EP2021/075990, filed on Sep. 22, 2021, which claims priority to China Patent Application No. PCT/CN2020/118965, filed on Sep. 29, 2020, the entire contents of which are being incorporated herein by reference.

The present invention relates to a low power standby circuit. The present invention relates in particular to a low power standby circuit for electric appliances such as for example, but not exclusively, beverage preparation machines.

Energy consumption is a major concern worldwide and low energy consumption has thus become an important quality feature of electric appliances, in particular of domestic appliances. The electric power consumed by electric appliances while plugged in on the electric mains, or line power, while in an inoperative mode, for example in a standby mode, has for example gained much attention.

Electric appliances such as domestic appliances often feature a standby mode from which they can be rapidly switched to an operative mode by actuating for example a switch button, preferably a soft button, a remote control, or any other appropriate actuator. While in standby mode, the electric consumption of the appliance is usually significantly reduced compared to the electric consumption of the appliance in operative mode. The electric consumption of an electric appliance in standby mode is however not null because at least part of its control electronics usually remains active in order to sense the actuation by a user of the actuator to wake up the appliance and bring it into its operative mode.

There is a need to minimize electric consumption of such electric appliances while in standby mode in order to contribute reducing their overall electric consumption.

Several solutions have been proposed for minimizing standby power consumption of electric appliances, but there is still room for improvement in attempting to achieve what is commonly designated as zero-power standby consumption, which corresponds to a power consumption in standby mode of less than 5 mW.

An aim of the present invention is thus to provide a standby circuit with minimal energy consumption.

An aim of the invention is in particular to provide a standby circuit that allows achieving a standby power consumption of less than 5 mW.

Another aim of the invention is to provide a standby circuit with minimal consumption that can bring an electric appliance into its operative mode upon actuation of a low power active or passive power-on switch and/or sensor of the standby circuit.

These aims and other advantages are achieved by the object of the present invention.

These aims and other advantages are achieved in particular by a standby circuit for an electric appliance, the standby circuit comprising: an AC power input for connection to an AC power source, for example to the mains; an AC power output for connection to a control circuit of an electric appliance; a control circuit power line connecting the AC power input to the AC power output, the control circuit power line comprising a control circuit power switch for closing and opening the control circuit power line; a logic device for controlling the control circuit power switch; an auxiliary AC to DC converter connected to the AC power input for supplying DC power to the logic device when the control circuit power line is open; a power-on AC to DC converter connected to the AC power output for supplying DC power to the logic device when the control circuit power line is closed; one or more passive and/or active input components for sensing an input of a user of said electric appliance and generating a corresponding signal; wherein the logic device is configured to receive the signal from the one or more passive and/or active input components, and to control the control circuit power switch based on this signal.

Using an auxiliary AC to DC converter for supplying DC power to the standby circuit when the electric appliance is in its standby mode and another power-on AC to DC converter for supplying DC power to the standby circuit when the electric appliance is in its operative mode allows designing an auxiliary AC to DC converter with a minimal energy consumption, which is dimensioned to provide only the amount of DC power required by the one or more active or passive components for sensing the user input, by the logic device and for switching on the control circuit power switch. The higher power required by the standby circuit while the electric appliance is in its operative mode, for example in order to drive the control circuit power switch once closed, is provided by the preferably more powerful power-on AC to DC controller that is not powered when the electric appliance is in its standby mode.

The control circuit power switch is for example a TRIAC, for example an optotriac, or a relay.

Preferably, the impedance of the AC live input of the auxiliary AC to DC converter is higher than the impedance of the AC live input of the power-on AC to DC converter, such that the auxiliary AC to DC converter is inactive when the control circuit power line is closed and the power-on AC to DC converter is powered.

Preferably, the auxiliary AC to DC converter and the power-on AC to DC converter only comprise discrete components.

In embodiments, the one or more passive and/or active input components comprise a soft switch button.

In embodiments, the one or more passive and/or active input components comprise an active component, for example a Hall sensor.

These aims and other advantages are also achieved by an electric appliance, for example beverage preparation machine, comprising such a standby circuit, a control circuit for controlling the electric appliance and an electrical load, wherein power supply to the control circuit is switched by the standby circuit, and power supply to the load is switched by the control circuit.

These aims and other advantages are also achieved by a method for bringing such an electric appliance from its standby mode to its operative mode, the method comprising the steps of:
  actuating by a user one of the one or more passive and/or active input components;
  receiving by the logic device of the standby circuit a signal from the one of said one or more passive and/or active input components;
  emitting by the logic device a control signal for switching on the control circuit power switch for powering on the control circuit of the appliance.

Preferably, the method further comprises the step of closing the load power switch by the control circuit in order to power on the load of the appliance.

The invention will be better understood with the following detailed description, illustrated by the figures, where:

Figure 1:
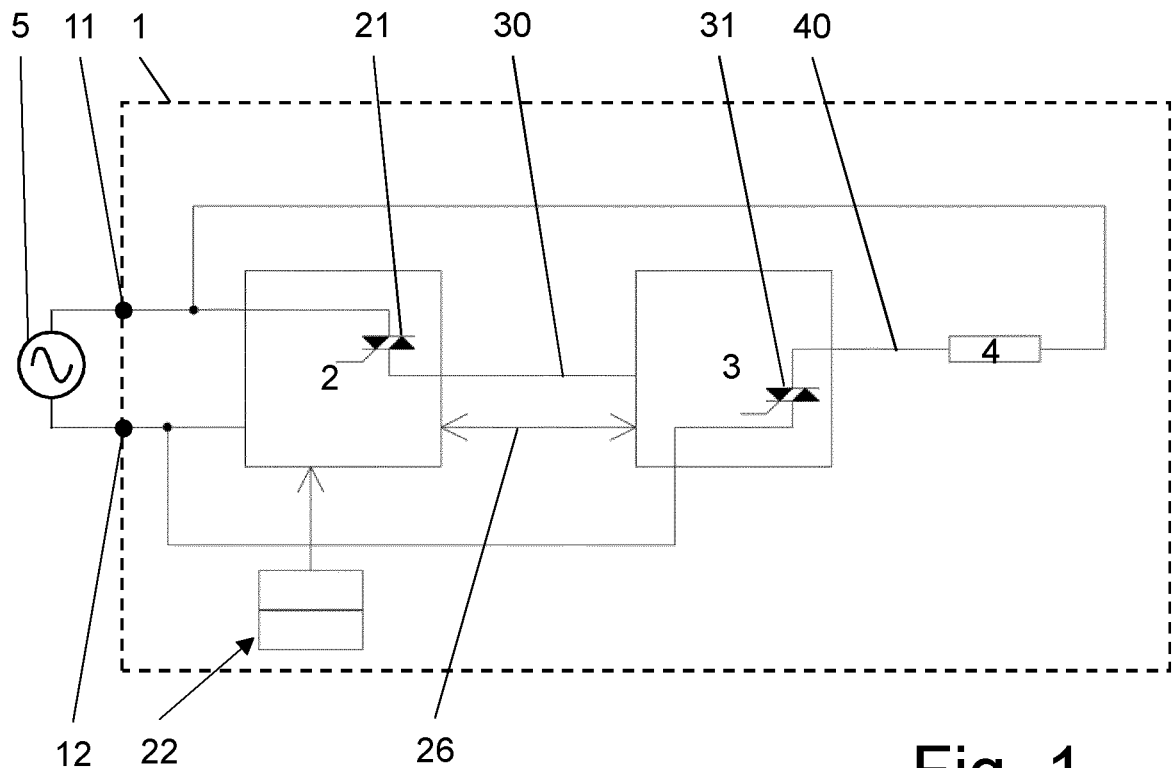
FIG. 1 is a schematic of an electric appliance with a standby circuit according to the invention.

FIG. 1 schematically illustrates an electrical appliance 1 comprising a standby circuit 2 according to the invention. The electric appliance 1 is for example a domestic appliance, such as, for example but not exclusively, a beverage preparation machine, for example a coffee and/or tea preparation machine. According to the invention, the standby circuit 2 controls the appliance 1 when the appliance 1 is in a standby mode, while a control circuit 3 of the appliance 1 controls the appliance 1 in an operative mode. The appliance 1 generally further comprises an electrical load 4 such as for example, but not exclusively, one or more of a pump, a heater, a motorized brewing unit and/or any other AC powered electrical component of the electrical appliance, which is preferably controlled by the control circuit 3 of the appliance 1.

The electric appliance 1 preferably comprises an AC power terminal 11, 12 for its electrical connection to an external AC power source 5. The AC power terminal 11, 12 is for example a power plug for its connection to a power socket connected to the mains, i.e. to the public power distribution network. The AC power terminal 11, 12 preferably comprises an AC live (AC-L) input terminal 11 and an AC neutral (AC-N) input terminal 12.

When the electrical appliance 1 is connected to the AC power source 5 and is in its standby mode, most of its functionalities are disabled. In particular, the electrical load 4 and the control circuit 3 are not powered. The standby circuit 2 however remains powered on while the appliance 1 is in its standby mode. As will be explained in more details further below, the standby circuit 2 is configured for switching the control circuit power line 30 to the control circuit 3 and the control circuit 3 is configured for switching the load power line 40 to the load 4. Preferably, the standby circuit 2 is configured for switching both on and off the control circuit power line 30.

When the electrical appliance 1 is in its operative mode, most of its components, preferably all of its components, are powered on and operational. The control circuit 3 is configured for controlling the functioning of the appliance 1 while in operating mode in a manner commonly known in the art that will thus not be described herein in all details. The control circuit 3 is preferably connected to and/or comprises a user interface of the appliance 1 (not illustrated in the figures) for receiving commands from a user of the appliance 1 and controlling the various elements of the appliance 1 accordingly in order to achieve the requested function or operation, for example the production and delivery of a beverage. Alternatively or additionally, the user interface is remote from the appliance, for example as a dedicated external remote control and/or as an application on a mobile device such as for example a smartphone or a laptop that communicates with the appliance 1 preferably using a wireless communication protocol such as for example Bluetooth or WiFi, for transmitting user commands to the control circuit 3 of the appliance 1.

The control circuit 3 preferably controls the power supply to the load 4 of the appliance 1, for example by controlling a load power switch 31, for example a TRIAC or a relay, that switches the load power line 40 to the load 4. The control circuit 3 is preferably configured to further control the functioning of the appliance 1 when in its operative mode, including the functioning of the load 4. The nature of the load 4 depends on the nature and on the functionalities of the appliance 1. The load 4 may for example include one or more electric motors, a pump, a heater, and/or any other AC powered electric element of the appliance 1.

According to the invention, the control circuit 3 is powered over the control circuit power line 30 that is switched by the standby circuit 2. The AC power provided by the AC power source 5 when connected to the appliance's AC input terminal 11, 12 is preferably converted by an AC-DC converter of the control circuit 3 into appropriate DC power, for example 3V, 5V and/or any other appropriate DC voltage, for powering the electronic components of and/or controlled by the control circuit 3.

The control circuit 3 typically comprises a logic device, for example a ASIC or a MCU, that acts as the main controller of the electrical appliance 1 for receiving control signals, for example from the user interface, from sensors and/or from the standby circuit 2, and for controlling the operation of the elements of the appliance 1 while in operating mode in order to achieve the desired function of the appliance 1. The control circuit 3 preferably further comprises memory storage for storing firmware and/or software to be executed for example by the logic device of the control circuit 3 and/or for storing parameters such as user preferences, operation parameters, etc.

In an exemplary embodiment, the appliance 1 is a beverage preparation machine, for example a machine for preparing coffee- and/or tea-based beverages. The load 4 for example comprises one or more of: a first pump for circulating water through a brewing unit containing a beverage ingredient, for example ground coffee and/or tea leaves; a first heater for heating the water before it enters the brewing unit; a motor for opening and closing the brewing unit; a grinder for grinding coffee beans; a second pump for pumping another liquid beverage ingredient, for example milk; a second heater and/or a foamer for heating and/or foaming milk; etc. The control unit 3 preferably controls the load 4, i.e. the AC powered elements of the appliance 1, in a manner known in the art in order to achieve the preparation of the requested beverages through appropriate operation sequences of the elements of the load 4. The control circuit 3 may comprise and/or control other electronic components of the beverage preparation machine such as for example sensors and/or input devices of a user interface. The control unit 3 for example comprises an ingredient detecting and/or recognizing module for detecting and/or recognizing a beverage ingredient introduced in the beverage preparation machine and preferably adapt the sequence of operations, i.e. the beverage preparation recipe, to the ingredient. Additionally or alternatively, the control unit 3 comprises or controls further sensors such as for example one or more level sensors for controlling the level of a liquid, for example water or milk, in a corresponding reservoir, one or more temperature sensors for controlling the temperature of one or more heaters, etc.

Figure 2:
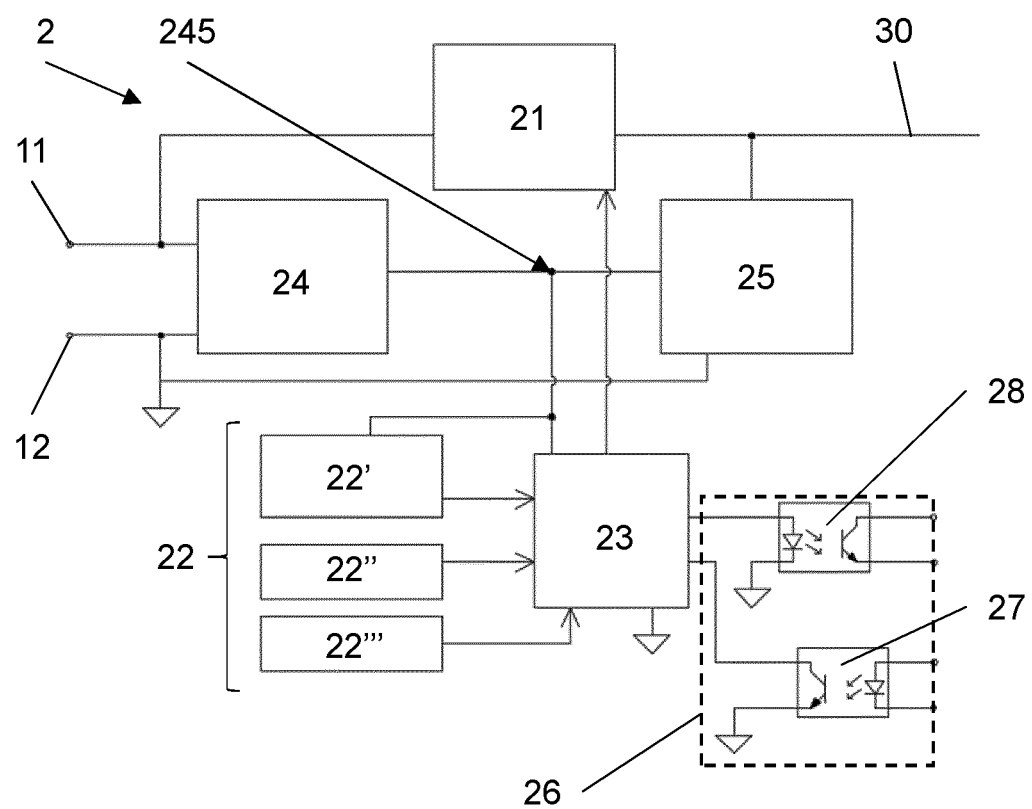
FIG. 2 is a schematic of a standby circuit according to the invention.

According to the invention, and with reference to FIG. 2, the standby circuit 2 comprises the control circuit power switch 21, for example a TRIAC or a relay, for switching the control circuit power line 30 to the control circuit of the appliance.

The standby circuit 2 further comprises two AC to DC converters for supplying DC power to the electronic components of and/or controlled by the standby circuit 2: an auxiliary AC to DC converter 24 and a power-on AC to DC converter 25. The AC input side of the auxiliary AC to DC converter 24 is electrically connected to the AC power input terminal 11, 12 of the appliance, such that when the electrical appliance is plugged in to an appropriate AC power source, for example to the mains, the AC input side of the auxiliary AC to DC converter 24 is directly connected to and powered from this AC power source. The AC input side of the power-on AC to DC converter 25 is electrically connected to the power line 30 to the control circuit 3, downstream of the control circuit power switch 21 relative to the power source, and to the AC-L input terminal 12 of the appliance, such that the power-on AC to DC converter 25 is powered only when the control circuit power line 30 is closed, i.e. when the control circuit is powered on. The auxiliary AC to DC converter 24 and the power-on AC to DC converter 25 share a common DC output 245 to supply DC power to the electronic components of and/or controlled by the standby circuit 2.

When the appliance is in its standby mode, the electronic components of the standby circuit 2 are powered by the DC power provided by the auxiliary AC to DC converter 24. When the appliance is in its operative mode, the control circuit power line 30 is closed and the electronic components of the standby circuit 2 are preferably powered by the DC power provided by the power-on AC to DC converter 25.

The standby circuit 2 comprises a logic device 23 for controlling the control circuit power switch 21 and/or other electronic components 22 of and/or controlled by the standby circuit 2, such as active or passive power-on switches and/or sensors 22', 22", 22'". The logic device 23 of the standby circuit 2 is for example configured to receive one or more signals from the one or more active or passive power-on switches or sensors 22', 22", 22'" and to emit a control signal for switching the power switch 21 of the standby circuit 2 based on the one or more signals received. The one or more switches 22', 22", 22'" for example comprise an actuator such as a soft button, a tactile switch button, a Hall sensor, a REED switch and/or any other appropriate actuator for switching the appliance from its standby state to its operating state. The one or more switches and/or sensors 22', 22", 22'" are preferably part of the user interface of the appliance. For safety and/or construction simplicity reasons, the one or more switches and/or sensors 22', 22", 22'" are preferably low power components.

The standby circuit 2 preferably further comprises a communication interface 26 for communicating with the control circuit of the appliance when the control circuit is powered on. The communication interface 26 preferably comprises an input signal interface 27 and an output signal interface 28 for respectively receiving and sending signals to the control circuit of the appliance. The input and output signal interfaces 27, 28 are preferably optocouplers, thereby avoiding any galvanic connection between the logic device 23 of the standby circuit 2 and the logic device or any other electronic component of the control circuit of the appliance.

The signals received by the standby circuit 2 from the control circuit of the appliance may for example include a status signal indicating the power status of the appliance, i.e. indicating for example whether the appliance is in its operative mode. The signals sent from the standby circuit 2 to the control circuit of the appliance may for example include a switch-off signal to indicate to the control circuit that the appliance should be switched to its standby mode, such that the control circuit may switch off the load and the other components of the appliance in a controlled manner, before the standby circuit 2 switches off the control circuit by opening the control circuit power line 30. A switch-off signal may for example be sent to the control circuit by the logic device 23 following the activation by a user of the appliance of one of the one or more switches or sensors 22', 22", 22'".

Other status and/or control signals may be exchanged between the standby circuit 2 and the control circuit of the appliance for the management of the appliance while in operative mode.

Figure 3:
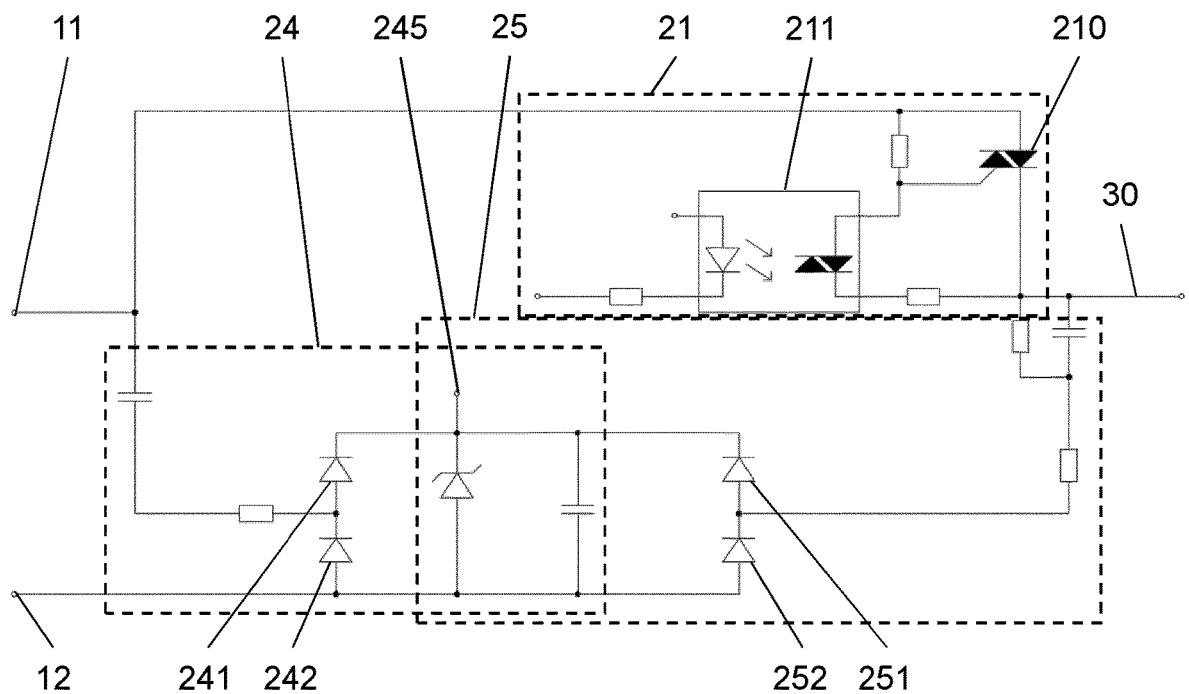
FIG. 3 is an electrical schematic of an embodiment of the power part of a standby circuit according to the invention.

In a preferred embodiment of the standby circuit 2 according to the invention illustrated in FIG. 3, the auxiliary AC to DC converter 24 and the power-on AC to DC converter 25 each comprise a pair of rectifier diodes 241, 242 and 251, 252 respectively, for a full-wave rectification of the AC power present at their respective AC input. The pair of rectifier diodes 241, 242 of the auxiliary AC to DC converter 24 are thus connected such as to rectify the AC power applied at the AC input terminal 11, 12 of the appliance, while the pair of rectifier diodes 251, 252 of the power-on AC to DC converter 25 are connected such as to rectify the AC power applied between the control circuit power line 30 downstream from the control circuit power switch 21 and the AC-L input terminal 12 of the appliance. The standby AC to DC converter 24 and the power-on AC to DC converter 25 preferably comprise a common smoothing stage and a common DC output terminal 245. In a preferred embodiment illustrated in FIG. 3, the common smoothing stage for example comprises a DC capacitor and a reverse breakdown diode, for example a Zener diode, connected in parallel with the pairs of rectifier diodes 241, 242 and 251, 252. The common DC output terminal 245 is the DC power source for the electronic components of the standby circuit 2.

Preferably, the auxiliary AC to DC converter is dimensioned to provide enough DC power for powering: the logic device 23 of the standby circuit 2; the possibly active one or more sensors 22', 22", 22'" for generating a wake up signal for the standby circuit 2 to switch the appliance from its standby mode to its operative mode; and to drive the control circuit 21 in an initial phase while the appliance is being brought to its operative mode. In order to minimize the appliance standby consumption, the auxiliary AC to DC converter 24 is preferably dimensioned such that it doesn't provide enough DC power for driving the control circuit power switch 21 while the appliance is in its operative mode and the control circuit power line 30 must be kept closed. The power-on AC to DC converter 25 is thus preferably dimensioned such as to provide more DC power than the auxiliary AC to DC power convertor 25 does, such that it can power all components of the standby circuit 2, including driving the control circuit power switch 21 while the appliance is in operative mode. The AC live input line of the auxiliary AC to DC converter 24 for example comprises an AC capacitor and a resistor in series for reducing the level of the AC voltage applied at the rectifier diodes 241, 242 in a conventional manner and to minimize power consumption while the appliance is in its standby mode. The AC live input line of the power-on AC to DC converter 25 comprises a voltage divider comprising a first resistor in series with a second resistor that is connected in parallel to an AC capacitor, thereby allowing more power into the power-on AC to DC power converter 25 than into the auxiliary AC to DC power convertor 24.

The control circuit power switch 21 switching the control circuit power line 30 is for example a TRIAC 210 whose switching signal is controlled through an optotriac 211, which is in turn switched by a control signal from the logic device 23 of the standby circuit 2. The use of an optotriac 211 allows preventing any galvanic contact between the standby circuit 2 and the AC power line 30, thereby increasing the overall safety of the appliance.

Figure 4:
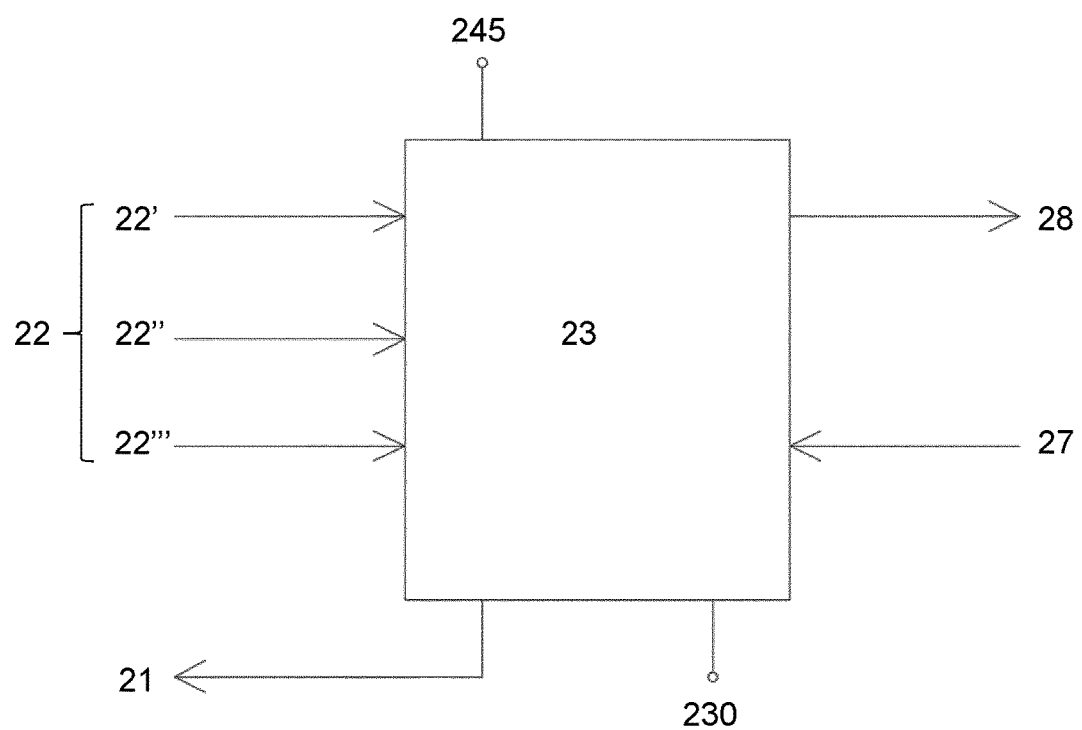
FIG. 4 illustrates the logic device of the standby circuit of FIG. 3 with its interfaces.

An example of a logic device 23 of a standby circuit according to the invention is schematically illustrated in FIG. 4. The logic device 23 is for example a microcontroller, and MCU or any appropriately configured integrated circuit. The logic device 23 is powered from the DC power available at the common DC output 245 of the auxiliary and of the power-on AC to DC converters 24, 25. In a conventional manner, the logic device 23 is also connected to the ground 230 of the standby circuit. The logic device 23 further comprises one or more input signal interfaces for receiving signals from the one or more switches or sensors 22', 22", 22''', and a bidirectional communication interface for communicating with the control circuit of the appliance via the input signal interface 27 and the output signal interface 28. The logic device 23 further comprises a control signal interface for sending a control signal to the control circuit power switch 21, in particular for switching the optotriac 211 of the control circuit power switch 21.

According to the invention, only the standby circuit 2 is powered on when the appliance 1 is in standby mode. The number of elements of the standby circuit 2 is kept to a minimum, i.e. the logic device 23 with functionalities limited to the control of the elements of the standby circuit 2, the one or more passive and/or active switches or sensors 22 for generating a signal for the logic device 23 to power on and/or off the appliance 1, and the control circuit power switch 21 that may be switched with a simple low power signal from the logic device 23. The overall electric consumption of the elements of the standby circuit 2 may thus be kept below the zero-power limit of 5 mW, thereby allowing the use of an auxiliary AC to DC power converter 24 made of discrete elements only in order to provide enough DC power to these elements while the appliance is in standby mode. The present invention thereby allows achieving a standby consumption of less than 5 mW.

Furthermore, switching the DC power supply from the auxiliary AC to DC converter 24 to the power-on AC to DC power converter 25 is done through hardware configuration of the respective input stages of the AC to DC converters only.

In operative mode, the appliance 1 is controlled by the control circuit 3 that typically requires more power than the standby circuit 2, but which is completely turned off during standby.

The complete galvanic separation between the standby circuit 2 and the control circuit 3 and the complete switch off of the control circuit 3 when the appliance is in standby mode allows freely designing the control circuit 3 according to the needs of the appliance, without requiring too much attention to its power consumption in a reduced activity mode.

The invention claimed is:

1. A standby circuit for an electric appliance, the standby circuit comprising:
   an alternating current (AC) power input for connection to an AC power source,
   an AC power output for connection to a control circuit of an electric appliance,
   a control circuit power line connecting the AC power input to the AC power output, the control circuit power line comprising a control circuit power switch for closing and opening the control circuit power line;
   a logic device for controlling the control circuit power switch;
   an auxiliary AC to direct current (DC) converter connected to the AC power input for supplying DC power to the logic device when the control circuit power line is open;
   a power-on AC to DC converter connected to the AC power output for supplying DC power to the logic device when the control circuit power line is closed;
   one or more passive and/or active input components for sensing an input of a user of the electric appliance and generating a corresponding signal; and
   the logic device is configured to receive the corresponding signal from the one or more passive and/or active input components, and to control the control circuit power switch based on the corresponding signal,
   wherein the standby circuit further comprises a communication interface for communicating with the control circuit of the electric appliance when the control circuit is powered on, wherein the communication interface comprises an input signal interface and an output signal interface for respectively receiving and sending signals to the control circuit of the electric appliance.

2. The standby circuit according to claim 1, wherein the control circuit power switch is a triode for alternating current (TRIAC).

3. The standby circuit according to claim 1, wherein the control circuit power switch is an optotriac.

4. The standby circuit according to claim 1, wherein the control circuit power switch is a relay.

5. The standby circuit according to claim 1, wherein impedance of the AC live input of the auxiliary AC to DC converter is greater than impedance of the AC live input of the power-on AC to DC converter.

6. The standby circuit according to claim 1, wherein the auxiliary AC to DC converter and the power-on AC to DC converter only comprise discrete components.

7. The standby circuit according to claim 1, wherein the one or more passive and/or active input components comprise a soft switch button.

8. The standby circuit according to claim 1, wherein the one or more passive and/or active input components comprise an active component.

9. The standby circuit according to claim 1, wherein the one or more active input components is-comprise a Hall sensor.

10. The standby circuit according to claim 1, wherein the input and output signal interfaces are optocouplers.

11. The standby circuit according to claim 1, wherein the auxiliary AC to DC converter and the power-on AC to DC converter each comprise a pair of rectifier diodes for a full-wave rectification of the AC power present at their respective AC input.

12. An electric appliance comprising:
   a standby circuit for an electric appliance, the standby circuit comprising:
   an AC power input for connection to an AC power source,
   an AC power output for connection to a control circuit of an electric appliance,
   a control circuit power line connecting the AC power input to the AC power output, the control circuit power line comprising a control circuit power switch for closing and opening the control circuit power line;
   a logic device for controlling the control circuit power switch;
   an auxiliary AC to DC converter connected to the AC power input for supplying DC power to the logic device when the control circuit power line is open;

a power-on AC to DC converter connected to the AC power output for supplying DC power to the logic device when the control circuit power line is closed;

one or more passive and/or active input components for sensing an input of a user of the electric appliance and generating a corresponding signal; and the logic device is configured to receive the corresponding signal from the one or more passive and/or active input components, and to control the control circuit power switch based on the corresponding signal, wherein the standby circuit further comprises a communication interface for communicating with the control circuit of the electric appliance when the control circuit is powered on, wherein the communication interface comprises an input signal interface and an output signal interface for respectively receiving and sending signals to the control circuit of the electric appliance;

the control circuit for controlling the electric appliance;

an electrical load;

wherein power supply to the control circuit is switched by the standby circuit, and power.

13. The electric appliance according to claim 12, wherein the input and output signal interfaces are optocouplers.

14. The electric appliance according to claim 12, wherein the auxiliary AC to DC converter and the power-on AC to DC converter each comprise a pair of rectifier diodes for a full-wave rectification of the AC power present at their respective AC input.

15. The electric appliance according to claim 12, wherein the electric appliance comprises a beverage preparation machine.

* * * * *